Nov. 22, 1955 D. L. ANDERSON ET AL 2,724,342
MEAT HOOK STABILIZER
Filed June 2, 1953
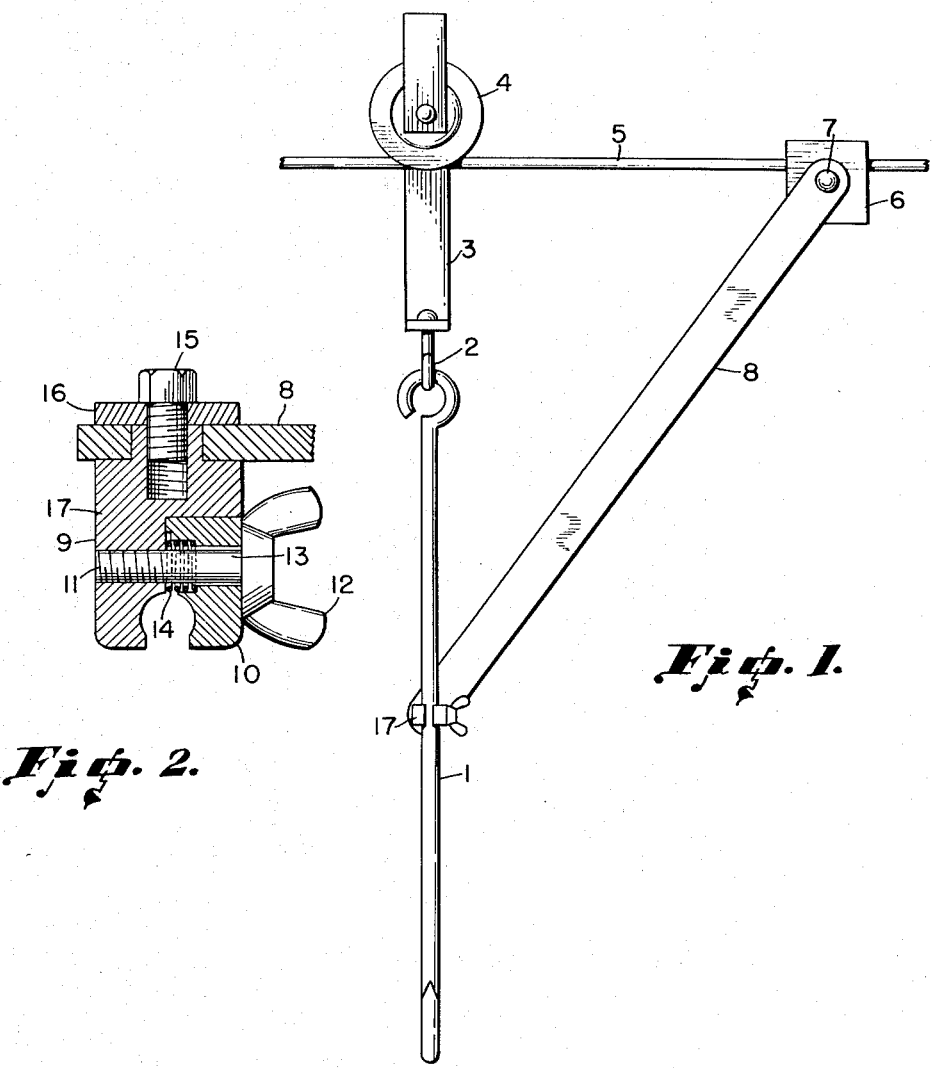
INVENTORS
D. L. ANDERSON
P. F. SHAFFER
R. H. KNOWLES
E. M. HARWELL
E. F. NASH
J. L. LEWIS
BY
R. Hoffman  ATTORNEY United States Patent Office 2,724,342
Patented Nov. 22, 1955

2,724,342

MEAT HOOK STABILIZER

Dale L. Anderson and Paul F. Shaffer, Miami Springs, Robert H. Knowles and Edward M. Harwell, Coral Gables, Fla., and Eugene F. Nash, Atlanta, and James L. Lewis, Marietta, Ga.; dedicated to the free use of the People in the territory of the United States Application June 2, 1953, Serial No. 402,191

2 Claims. (Cl. 104—89)

A non-exclusive, irrevocable, royalty-free license in the invention herein described, for all Governmental purposes, throughout the world, with the power to grant sublicenses for such purposes, is hereby granted to the Government of the United States of America.

We hereby dedicate the invention herein described to the free use of the people in the territory of the United States to take effect on the granting of a patent to us.

This invention relates to a stabilizing device for use with traveling meat hooks of the type used to carry carcass beef on an overhead rail. These hooks are conventionally suspended from a pulley riding on an overhead rail and travel between various stations, such as, for example, a loading platform and other points in a plant. Some portions of the carcass, particularly the fore quarter, are hung with the hook placed on the inside of the quarter between the fourth and fifth rib about four inches from the chine bone. Two men are required to unload it from the delivery truck, one man carrying the quarter while the other holds the meat hook which swings freely from the pulley.

It is an object of this invention to provide a stabilizing device which will eliminate the necessity of holding the hook while it is being loaded.

Other objects will be apparent from the following description of the invention and the accompanying drawing.

In the drawing:

Figure 1 represents the device in actual use at a receiving station, such as a loading platform for receiving carcass beef, veal, or lamb from a delivery truck.

Figure 2 shows the details of construction of the clamp used to hold the meat hook rigid.

Figure 1 shows a conventional hook 1 suspended by means of eye 2 from bracket 3 which also carries pulley 4. This pulley rides on an overhead rail 5. The stabilizer of this invention consists of a bracket 6 which is hung on the end of the overhead rail at the loading platform. Pivotally connected to this bracket by means of pin 7 is an elongated bar 8 of sufficient length to intersect the meat hook near its midpoint. At the intersecting end of this bar is a clamp 17 which slips around the hook and holds it rigid during the meat loading operation. The clamp consists of two separate jaws 9 and 10. The larger jaw 9 has a tapped hole 11 which accommodates the threaded portion of wing bolt 12 which also passes through unthreaded hole 13 in smaller jaw 10. A spring 14 serves to keep the jaws of the clamp in a normally open position. The clamp assembly is mounted on the bar 8 by means of bolt 15 and bearing washer 16.

In actual use all that is necessary is to position the meat hook on the rail near the stabilizer, clamp the hook, hang the carcass, release the clamp, and ride the hook away. This operation is rapid and simple, and eliminates the need for the presence of a second man at the loading station.

Many variations within the scope of the invention will be obvious to those skilled in the art.

We claim:

1. In combination with a meat hook suspended from a pulley travelling on an overhead rail, a stabilizer for said meat hook comprising a bracket fixed to the overhead rail to one side of a receiving station, an elongated bar pivotally secured by one end thereof to said bracket, and a clamp mounted at the other end of said elongated bar, said clamp being adapted to be removably rigidly secured to the meat hook.

2. In the use of a meat hook suspended from a pulley travelling on an overhead rail for the purpose of receiving carcass beef, veal or lamb, a stabilizer for said hook comprising a bracket fixed to the overhead rail to one side of a receiving station, an elongated bar pivotally secured by one end thereof to said bracket, and a clamp mounted at the other end of said elongated bar, said clamp being adapted to be removably rigidly secured to the meat hook.

References Cited in the file of this patent

UNITED STATES PATENTS

| 341,501 | Pendleton | May 11, 1886 |
| 797,769 | Hall | Aug. 22, 1905 |
| 1,778,332 | Meyer | Oct. 14, 1930 |